United States Patent
Gamble (12)

(10) Patent No.: US 6,370,481 B1
(45) Date of Patent: Apr. 9, 2002

(54) APPARATUS AND METHOD FOR HUMAN PRESENCE DETECTION IN VEHICLES

(75) Inventor: Thomas D. Gamble, Annandale, VA (US)

(73) Assignee: Ensco, Inc., Springfield, VA (US)

( * ) Notice: Subject to any disclaimer, the term of this patent is extended or adjusted under 35 U.S.C. 154(b) by 0 days.

(21) Appl. No.: 09/352,193

(22) Filed: Jul. 13, 1999

Related U.S. Application Data

(60) Provisional application No. 60/092,790, filed on Jul. 14, 1998.

(51) Int. Cl.[7] ............... G01H 13/00; G01H 1/06; G01V 1/28
(52) U.S. Cl. ............... 702/56; 702/56; 340/566; 340/690; 340/426; 340/429
(58) Field of Search ............... 702/56, 54, 73; 340/566, 690, 667, 426, 429

(56) References Cited

U.S. PATENT DOCUMENTS

| | | | | |
|---|---|---|---|---|
| 4,096,474 A | * | 6/1978 | Greer et al. ............... | 340/261 |
| 4,415,979 A | * | 11/1983 | Hernandez ............... | 364/508 |
| 5,854,993 A | * | 12/1998 | Grichnik ............... | 702/54 |
| 6,222,442 B1 | * | 4/2001 | Gager et al. ............... | 340/426 |

OTHER PUBLICATIONS

Geo Vox Secuirty, Inc., Advanced Vehicle Interrogation and Notificaiton (AVIAN) Security System—Users Manual pp. 1–10.

The Heartbeat Detector—Enclosed Space Detection System, Leo Labaj; National Security Program Office;.

AVIAN Security System, GeoVox Security Inc. Article.

R&D Research and Development; Sep. 1997, vol. 39, No. 10 a Cahners Publication.

* cited by examiner

*Primary Examiner*—Marc S. Hoff
*Assistant Examiner*—Paul Kim
(74) *Attorney, Agent, or Firm*—Nixon Peabody LLP; Daniel W. Sixbey

(57) ABSTRACT

An apparatus and method for human presence detection in vehicles where a vehicle vibration sensor is provided to sense vehicle vibration. This vibration signal is processed to obtain a measure of vehicle vibration independent of vehicle damping. Also, a seismic sensor senses ground vibrations in the area of the vehicle simultaneously with the sensing of vehicle vibration, and if the ground vibration exceeds a first threshold, the measure of vehicle vibration is discarded. Similarly, an infrasonic sensor may be used to sense infrasonic wind vibrations adjacent to the vehicle simultaneously with the sensing of vehicle vibration. When the infrasonic vibration within a desired frequency range exceeds a second threshold value, the measure of vehicle vibration is discarded.

30 Claims, 1 Drawing Sheet

APPARATUS AND METHOD FOR HUMAN PRESENCE DETECTION IN VEHICLES

This application is a continuation in part application of provisional application Ser. No. 60/092,790 filed Jul. 14, 1998.

BACKGROUND OF THE INVENTION

When the human heart contracts, it accelerates blood towards the head. The blood travels over the aortic arch, changing direction towards the feet. These accelerations produce equal and opposite forces on the body. A graph of the motion of a freely suspended body due to these forces is called a ballistocardiogram. Ballistocardiagrams have been studied extensively for medical diagnostic purposes. The minimum, resting amount of impulse is relatively constant between persons. The typical impulse per heartbeat is of the order of 5 Newton-seconds, with one heartbeat per second. Smaller individuals have a smaller impulse per heartbeat but more heartbeats per second. Most of the power is smoothly distributed over the 4 to 7 Hertz frequency range.

The shockwave generated by a beating human heart couples to any object with which the human body is in contact. Thus, the level of vibration produced by a beating heart is detectable by a geophone or similar sensor, even when a human is concealed in a large semi-tractor trailer.

Recognizing this concept, an early vehicle inspection system was developed which analyzes a histogram of vibration power levels over time to determine if there is a consistent minimum level. With systems of this type, as shown by U.S. Pat. No. 4,415,979 to Hernendez, ambient seismic or wind noise must be low to permit the system to operate rapidly and effectively. If seismic or wind noise is substantial, a detection decision with this prior system may require many minutes, and no conclusion may be reached in any reasonable amount of time. In some instances, false alarms may be produced.

Subsequently, an enclosed space detection system (EDS) was developed by Lockheed Martin Energy Systems, Oak Ridge, Tenn. and engineers for the Department of Energy, Oak Ridge Tenn. This system uses sophisticated wavelet transforms in combination with fast-Fourier transforms to isolate a detected heartbeat signal from other vibrations. A system operator must choose from a plurality of vehicle icons the one which most closely resembles the configuration of a vehicle to be inspected, and then a plurality of sensors unique to that vehicle configuration must be attached to the vehicle. If the wrong number of sensors are attached to a specific vehicle type or the sensors are not properly oriented, the system will not operate properly. Even when all sensors are properly attached to the vehicle, data may need to be retaken a plurality of times due to spurious ambient vibrations before an accurate indication relative to the presence or absence of a concealed human is obtained. High winds and ground vibration can result in false positive indications.

Obviously, systems using only vehicle mounted sensors can quickly and accurately determine whether or not a person is concealed within the vehicle under quiet ambient conditions by simply providing an indication as to whether sensed vibrations of the vehicle are above or below a threshold. However, vehicle vibration is normally also generated by wind and/or seismic vibration. Thus, sensed high vibration levels may not indicate that a concealed person is present, because the vibration may be due to these other sources.

The level of interference produced by the wind cannot be reliably predicted from the wind speed. A 15 mph wind may not cause a problem, while a 3 mph wind can cause consistent false alarms with solely vehicle mounted sensor systems. The level of wind interference also depends on the shape of the vehicle and the direction of the wind. A long, straight vehicle surface perpendicular to the wind direction will produce a larger vehicle vibration than will be produced by a more streamlined shape. The mechanism of vibration generation is the same as that which produces audible whistling at higher wind velocities. The frequencies for heartbeat detection are, as previously indicated, in the 4 to 7 Hz range. Wind of relatively low speed can sometimes produce substantial vehicle vibrations at these frequencies. The amplitude and frequency of wind vibrations also depend on the acoustic properties of cavities in the vehicle and other mechanical vehicle details.

For some applications, wind noise can be eliminated by placing the vehicle in an enclosure provided by a shelter or wind screen. Isolation from seismic noise would still not be present however, for while vehicle suspensions do provide substantial isolation from the ground, elements such as heavy truck traffic cause substantial seismic ground vibration levels.

SUMMARY OF THE INVENTION

It is a primary object of the present invention to provide a novel and improved apparatus and method for human presence detection in vehicles which deletes corrupted vehicle vibration data with simple thresholds on seismic and/or infrasonic power.

Another object of the present invention is to provide a novel and improved apparatus and method for human presence detection in vehicles which provides a stable measure of vehicle vibration, independent of vehicle damping, with the use of constant thresholds to eliminate the effects of high, disturbing forces.

Yet another object of the present invention is to provide a novel and improved apparatus and method for human presence detection in vehicles which employs a vehicle contact sensor to sense vehicle vibration levels and a ground contact sensor to sense seismic vibrations. The sensed seismic vibrations are compared to a threshold so that corrupted vehicle vibration data can be deleted.

A further object of the present invention is to provide a novel and improved apparatus and method for human presence detection in vehicles which includes a vehicle contact sensor to sense vehicle vibration levels and an infrasonic power sensor to sense infrasonic vibrations in the air near the vehicle within a desired frequency range and to compare the sensed infrasonic vibrations within the frequency range to a threshold so that corrupted vehicle vibration data can be deleted.

DESCRIPTION OF THE PREFERRED EMBODIMENT

Figure 1:
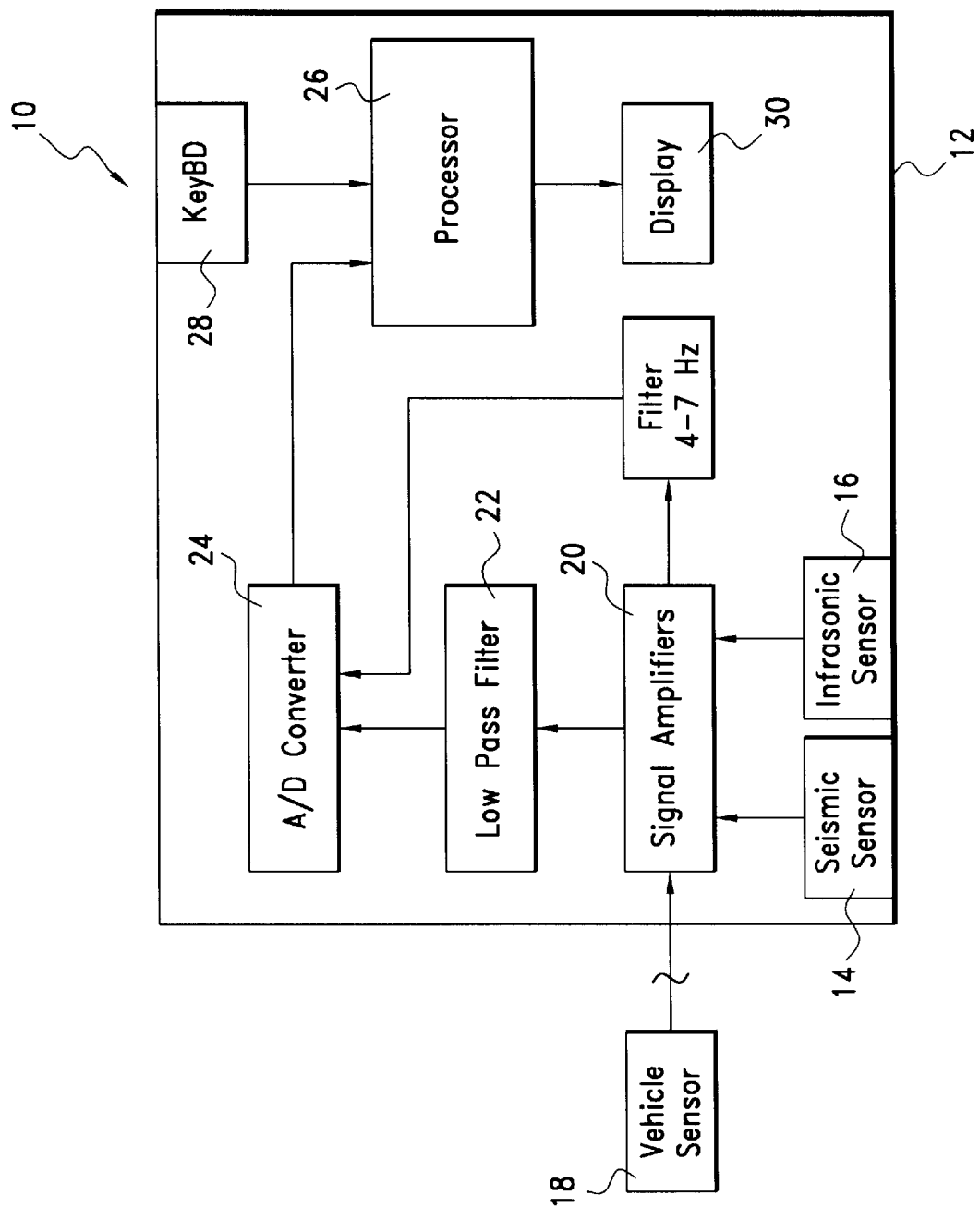
FIG. 1 is a block diagram of the Apparatus For Human Presence Detection In Vehicles of the present invention.

Referring now to the drawing, the apparatus for human presence detection in vehicles indicated generally at 10 includes a control system enclosure 12 which is positioned adjacent to, but spaced from the vehicle to be sensed. This is important, as merely pressing a button on a control system in contact with the vehicle may disturb the vehicle sufficiently to adversely affect the sensed data. The enclosure 12 may mount a seismic sensor 14 for contact with the ground and an infrasonic sensor 16 positioned to sense infrasonic vibrations in the air near the vehicle. A vehicle vibration sensor 18 is magnetically or otherwise suitably attached to a vehicle being sensed. The seismic and infrasonic sensors 14 and 16, like the vehicle sensor 18, can be remote from the enclosure 12, but they must be spaced from but adjacent to the vehicle being sensed. The seismic and vehicle sensors 14 and 18 can be geophones or other known vibration sensors which provide an analog signal indicative of sensed vibrations. The infrasonic sensor 16 provides an analog output signal indicative of sensed low frequency air vibrations.

The output signals from the sensors 14, 16 and 18 are amplified by suitable amplifiers 20, and the amplified signals from the vehicle sensor 18 and the seismic sensor 14 are filtered in a low pass filter section 22 and digitized in an analog to digital converter section 24. These digitized signals are then provided to a processor 26 which can be provided by a current generation personal computer.

The amplified output from the infrasonic sensor 16 is provided to a filter which passes a signal within a desired frequency range of interest, preferably 4–7 Hz, and the filter output is digitized in the analog to digital converter section 24 and then provided to the processor 26. Additional input data to the processor, such as vehicle mass data, is provided by a suitable input device 28 shown as a keyboard in the drawing.

Data is collected simultaneously from the seismic sensor 14, the infrasonic sensor 16, and the vehicle sensor 18, and data segments of at least four seconds in duration are used, overlapping by 50% in time. The digitized vehicle vibration signal is fast Fourier transformed in the processor 26, and Fourier components covering approximately 4 to 7 Hz are used in the computation of G in equation 6 to be described. The total power of the ground vibration sensed by the seismic sensor 14 is computed in the processor for each data segment, and is compared with a seismic threshold level stored in the processor. If the power of the ground vibration exceeds this threshold, the data segment is ignored. Even on very busy highways, heavily loaded trucks pass at intervals on the order of ten seconds. Thus detection can proceed within a few seconds as long as contaminated intervals are eliminated.

Similarly, when an infrasonic sensor 16 is used, it provides data simultaneously with the vehicle sensor 18 and the seismic sensor 14 for each data segment. A second threshold value stored by the processor is compared with data from the infrasonic sensor, and when this data shows that infrasonic vibrations in the air near the vehicle are above the second threshold amplitude in the frequency range of interest, then the data sample is ignored. Acceptable data is displayed on a suitable display device 30.

Turning now to the computations to be made by the processor 26, vehicle mass for a vehicle under inspection can be input by the keyboard 28 and can be easily estimated to the required accuracy. For example, gross vehicle weight, the maximum design weight of the vehicle with full load, can be used as an estimate of vehicle mass.

The average power of the motion of vehicles varies inversely with the spring constant and the damping of the suspension and the vehicle mass. The damping and spring constants, however, vary widely and cannot be estimated without extensive testing. However, the weighted average amplitude over a high resolution spectrum, rather than the average power, is independent of the damping and spring constants.

A vehicle of mass M, effective suspension spring constant k, and a coefficient of friction r, subjected to a force F, at angular frequency $\omega$, will move with an amplitude x where $$\left|\frac{x}{F}\right|^2 = \frac{1}{(k-\omega^2 M)^2 + \omega^2 r^2}. \quad (1$$

The maximum motion for a given force will be caused at frequency $\omega_0$ where $$\omega_0 = \sqrt{\frac{k}{M} - \frac{r^2}{2M^2}}. \quad (2$$

Strong resonances, which can significantly affect the amplitude of motion, have small damping coefficients. That is, $r^2 << 2$ kM and, to a good approximation, $$\omega_0 = \sqrt{\frac{k}{M}}. \quad (3$$

The peak power, at frequency $\omega_0$, is $$\left|\frac{x}{F}\right|_p^2 = \frac{1}{\omega_0^2 r^2} \quad (4$$

and the full width of the peak at half power is $$B = \sqrt{2}\frac{r}{M}. \quad (5$$

The total or average power over frequency is proportional to the product of equations 4 and 5, $$\frac{1}{\omega_0^2 rM}.$$

That is, it is inversely proportional to the coefficient of friction. The peak amplitude, $x(\omega_0)$, is proportional to the square root of equation 4. Thus the total amplitude or average over frequency, $\Sigma|x(\omega)|$, is proportional to $$\frac{1}{\omega_0 M},$$

independent of the damping.

Vehicle suspensions are more complicated than a single spring, with more than one resonant frequency. If the average of the amplitudes over multiple resonant peaks is weighted in proportion to the frequency, this removes all dependence on the vehicle other than its mass. That is $$G \equiv \sum_\omega \omega x(\omega) \propto \frac{1}{M}. \quad (6$$

Thus, MG is proportional to the total force applied, independent of any mechanical properties of the vehicle.

The dynamics of an actual vehicle are more complicated than that of a point mass supported by a single spring, with several modes of rotational and translational vibration. The amplitude of the motion of the ends of a vehicle tend to increase with the length and height of the vehicle. These effects tend to cancel out the dependence of G with the mass of the vehicle, as heavy vehicles are necessarily larger and taller. Testing has demonstrated that G, defined by equation 6, provides a much more stable measure of the ballistocardiographic force than does the vibration power, and provides a stable statistic for evaluating the probability that a vehicle contains a person.

I claim:

1. A method for detecting the presence of a human in a vehicle which includes the steps of:
   sensing the vehicle vibration to obtain a vehicle vibration signal indicative thereof;
   sensing the vibration of the ground in the area of the vehicle simultaneously with the sensing of the vehicle vibration to obtain a ground seismic signal indicative of the ground vibration;
   comparing the ground seismic signal to a first threshold value;
   discarding the vehicle vibration signal when the ground seismic signal exceeds the first threshold value.

2. The method of claim 1 which includes comparing the vehicle vibration signal to a second threshold value when the ground seismic signal does not exceed the first threshold value, and providing an indication of human presence when the vehicle vibration signal exceeds the second threshold value.

3. The method of claim 1 which includes sensing infrasonic vibrations in air adjacent to the vehicle simultaneously with the sensing of the vehicle vibration and the ground vibration to obtain a wind signal indicative of the sensed infrasonic vibrations,
   comparing the wind signal to a third threshold value and discarding the vehicle vibration signal when the wind signal exceeds the third threshold value.

4. The method of claim 3 which includes obtaining the wind signal for infrasonic vibrations occurring within a specific frequency range.

5. The method of claim 4 wherein the specific frequency range is from 4 to 7 Hz.

6. The method of claim 3 which includes comparing the vehicle vibration signal to a second threshold value when the ground seismic signal does not exceed the first threshold value and the wind signal does not exceed the third threshold value,
   and providing an indication of human presence when the vehicle vibration signal exceeds the second threshold value.

7. The method of claim 5 which includes comparing the vehicle vibration signal to a second threshold value when the ground seismic signal does not exceed the first threshold value and the wind signal does not exceed the third threshold value,
   and providing an indication of human presence when the vehicle vibration signal exceeds the second threshold value.

8. The method of claim 1 which includes dividing the vehicle vibration signal and ground seismic signal into sequential data segments of a specific time duration with each data segment including a segment of the vehicle vibration signal and a segment of the ground seismic signal, comparing the segment of the ground seismic signal in each data segment to a first threshold value,
   and discarding the vehicle vibration signal segment for a data segment when the ground seismic signal segment for such data segment exceeds the first threshold value.

9. The method of claim 8 which includes sensing infrasonic vibrations in air adjacent to the vehicle simultaneously with the sensing of the vehicle vibration and the vibration of the ground in the area of the vehicle to obtain a wind signal indicative of sensed infrasonic vibrations,
   dividing said wind signal into said sequential data segments to include a wind signal segment in each data segment,
   comparing the wind signal segment in each data segment with a second threshold value,
   and discarding the vehicle vibration signal segment for a data segment when the wind signal segment for such data segment exceeds the second threshold value.

10. A method for detecting the presence of a human in a vehicle which includes the steps of:
    sensing the vehicle vibration to obtain a vehicle vibration signal indicative thereof,
    separately sensing the infrasonic vibrations in the air adjacent to the vehicle simultaneously with the sensing of the vehicle vibration to obtain a wind signal indicative of the sensed infrasonic vibrations which is separate from said vehicle vibration signal,
    comparing the separate wind signal to a first threshold value,
    and discarding the vehicle vibration signal when the wind signal exceeds the first threshold value.

11. The method of claim 10 which includes limiting the wind signal for infrasonic vibrations to frequencies occurring within a specific frequency range.

12. The method of claim 11 wherein the specific frequency range is from 4 to 7 Hz.

13. The method of claim 12 which includes comparing the vehicle vibration signal to a second threshold value when the wind signal does not exceed the first threshold value,
    and providing an indication of human presence when the vehicle vibration signal exceeds the second threshold value.

14. The method of claim 10 which includes comparing the vehicle vibration signal to a second threshold value when the wind signal does not exceed the first threshold value,
    and providing an indication of human presence when the vehicle vibration signal exceeds the second threshold value.

15. The method of claim 10 which includes limiting the vehicle vibration signal to frequencies within a first frequency range, and
    limiting the wind signal to frequencies within a frequency range which is the same as said first frequency range prior to comparing the wind signal to said first threshold value.

16. The method of claim 15 wherein said first frequency range is from 4 to 7 Hz.

17. The method of claim 10 which includes dividing the vehicle vibration signal and wind signal into sequential data segments of a specific time duration with each data segment including a segment of the vehicle vibration signal and a separate segment of the wind signal, comparing the separate segment of the wind signal in each data segment to a first threshold value,
    and discarding the vehicle vibration signal segment for a data segment when the separate wind signal segment for such data segment exceeds the first threshold value.

18. The method of claim 17 which includes limiting the vehicle vibration signal to frequencies within a first frequency range, and
    limiting the wind signal to frequencies within a frequency range which is the same as said first frequency range.

19. A method for detecting the presence of a human in a vehicle which includes the steps of:

sensing the vehicle vibration to obtain an analog signal indicative of vibration, digitizing the analog signal to obtain a digital signal which is a function thereof, converting the digital signal to a fast Fourier transform, and processing the fast Fourier transform to obtain a measure of vehicle vibration independent of vehicle damping.

20. The method of claim 19 which includes using components of the fast Fourier transform covering a 4 to 7 Hz range to obtain the measure of vehicle vibration independent of vehicle damping.

21. The method of claim 19 which includes using components of the fast Fourier transform covering frequencies within a first frequency range to obtain the measure of vehicle vibration independent of vehicle damping, sensing infrasonic vibrations in air adjacent to the vehicle simultaneously with the sensing of the vehicle vibration to obtain a wind signal indicative of the sensed infrasonic vibrations, limiting the wind signal to frequencies within a frequency range which is the same as said first frequency range, comparing the wind signal to a first threshold value, and discarding the measure of vehicle vibration independent of vehicle damping when the wind signal exceeds said first threshold value.

22. The method of claim 21 which includes:

sensing the vibration of the ground in the area of the vehicle simultaneously with the sensing of the vehicle vibration to obtain a ground seismic signal indicative of the ground vibration, comparing the ground seismic signal to second threshold value, and discarding the measure of vehicle vibration independent of vehicle damping when the ground seismic signal exceeds the second threshold value.

23. An apparatus for detecting the presence of a human in a vehicle comprising a first sensor for sensing vehicle vibration to provide a vehicle vibration signal, a second sensor for sensing ground vibration in the area of the vehicle to provide a ground vibration signal, analog to digital conversion means connected to receive said vehicle vibration signal and said ground vibration signal and to provide a digital vehicle signal and a digital ground signal and a processor means connected to receive said digital vehicle signal and digital ground signal, said processor means operating to compare said digital ground signal to a first threshold value and to discard said digital vehicle signal when said digital ground signal exceeds said threshold value.

24. The apparatus of claim 23 wherein said processor means operates to process said digital vehicle signal to obtain a measure of vehicle vibration and to compare said measure of vehicle vibration to a second threshold when said digital ground signal does not exceed said first threshold value, said processor means providing an indication of human presence when said measure of vehicle vibration exceeds said second threshold value.

25. The apparatus of claim 23 which includes an infrasonic sensor for sensing infrasonic vibrations in air adjacent to the vehicle to provide a wind signal, said analog to digital conversion means being connected to receive said wind signal and to provide a digital wind signal, said processor means being connected to receive said digital wind signal and operative to compare the digital wind signal to a second threshold value and to discard said digital vehicle signal when said digital wind signal exceeds said second threshold value.

26. The apparatus of claim 25 wherein said processor means operates to process said digital vehicle signal to obtain a measure of vehicle vibration and to compare said measure of vehicle vibration to a third threshold value when said digital ground signal does not exceed said first threshold value and said digital wind signal does not exceed said second threshold value, said processor means providing an indication of human presence when said measure of vehicle vibration exceeds said third threshold value.

27. The apparatus of claim 26 which includes filter means connected to said infrasonic sensor to receive and limit said wind signal to a 4–7 Hz range.

28. An apparatus for detecting the presence of a human in a vehicle comprising a first sensor for sensing vehicle vibration to provide a vehicle vibration signal having a vibration signal frequency range, a second sensor for sensing infrasonic vibrations in air adjacent to the vehicle to provide a wind signal separate from said vehicle vibration signal, analog to digital conversion means connected to receive said vehicle vibration signal and said wind signal and to provide a digital vehicle signal and a digital wind signal, and a processor means connected to receive said digital vehicle signal and digital wind signal, said processor means operating to compare said digital wind signal to a first threshold value and to discard said digital vehicle signal when said digital wind signal exceeds said threshold value.

29. The apparatus of claim 28 wherein said processor means operates to process said digital vehicle signal to obtain a measure of vehicle vibration and to compare said measure of vehicle vibration to a second threshold value when said digital ground signal does not exceed said first threshold value, said processor means providing an indication of human presence when said measure of vehicle vibration exceeds said second threshold value.

30. The apparatus of claim 29 which includes a filter connected to said second sensor to receive and limit said wind signal to a frequency range substantially corresponding to the frequency range of said vehicle vibration signal.

* * * * *